United States Patent [19]
Trakas

[11] Patent Number: 5,098,280
[45] Date of Patent: Mar. 24, 1992

[54] SPRUE BUSHING WITH DISPLACEABLE GATING NEEDLE

[76] Inventor: Panos Trakas, 1820 Amelia La., Addison, Ill. 60101

[21] Appl. No.: 588,172

[22] Filed: Sep. 26, 1990

[51] Int. Cl.⁵ .................................... B29C 45/20
[52] U.S. Cl. .......................... 425/549; 264/328.15
[58] Field of Search ............ 425/549, 562, 564, 565, 425/566; 264/328.15

[56] References Cited

U.S. PATENT DOCUMENTS

| | | | |
|---|---|---|---|
| 2,834,050 | 5/1958 | Dymsza et al. | 222/448 |
| 3,954,209 | 5/1976 | Ramond | 425/146 |
| 4,034,952 | 7/1977 | Stewart | 249/105 |
| 4,125,352 | 11/1978 | Gellert | 425/566 |
| 4,279,588 | 7/1981 | Gellert | 425/568 |
| 4,389,002 | 6/1983 | Devellian et al. | 425/549 |
| 4,450,999 | 5/1984 | Gellert | 425/549 |
| 4,795,126 | 1/1989 | Crandell | 425/549 |
| 4,882,469 | 11/1989 | Trakas | 425/549 |

Primary Examiner—Timothy Heitbrink
Attorney, Agent, or Firm—Lockwood, Alex, Fitzgibbons & Cummins

[57] ABSTRACT

An improved gating needle for use in an injection molding sprue bushing has an elongated central needle portion and at least three radially extending members which extend radially outwardly from the central needle portion. The gating needle is seated in an annular cavity or circular recess disposed at the outlet end of a sprue bushing and is capable of slight axial movement due to the action of the injected melt flowing around it so that the needle maintains a constant position and clearance within the mold cavity gate. The gating needle may include an interior heat transfer portion in the form of either a highly thermally conductive metal core portion or in the form of a sealed hollow tube containing a vaporizable liquid, which interior portion transfers heat from the surrounding melt to the mold cavity gate to maintain the mold cavity gate area at a constant temperature.

14 Claims, 1 Drawing Sheet

SPRUE BUSHING WITH DISPLACEABLE GATING NEEDLE

BACKGROUND AND SUMMARY OF THE PRESENT INVENTION

The present invention relates to injection molding gating and more particularly, to an improved gating needle for use in an injection molding sprue bushing.

A variety of gating systems have been commonly used in the past with varying degrees of success for the injection molding of different materials in various applications. Proper gating is important in injection molding because it provides the necessary amount of heat to the mold cavity gate area to maintain the injected melt in a molten condition as it passes through the mold gate on its way to the mold cavity. It is desirable to maintain as high a melt temperature as possible in the mold gate area as the melt flows from the bushing through the gate and into the mold cavity, yet it is likewise desirable to avoid excessive heat transfer to the cooled mold blocks surrounding the mold gate. Proper gating provides the most efficient manner of injection molding.

Previous attempts at controlling the temperature of the gate area have been accomplished by the use of a heated torpedo disposed within a mold block and adjacent the gate area. Where the heated torpedo is internally heated, and the internal heater does not extend within the torpedo to a position very close to the gate area, it is difficult to maintain the temperature of the melt at the torpedo tip at a proper constant desired temperature. Other gating systems have used a central conductive pin which is driven by a reciprocating drive mechanism in which the central pin seals the mold gate at the end of every molding cycle. Such drive mechanism add to the cost and complexity of the overall injection molding system. Additionally, the central pin must be specially fabricated to withstand the repeated force of its closing the mold gate.

The present invention is directed to an economical injection molding sprue bushing gating needle which overcomes the aforementioned disadvantages. The present invention is characterized by a needle assembly which is slidingly disposed within a recess at the sprue bushing outlet end. The needle assembly includes an elongated needle member having a first end, a second end and an intermediate portion therebetween which has at least three outwardly projecting ribs. The ribs are received by a recess or annular opening disposed at the outlet end of a sprue bushing. When the needle assembly is in place within the sprue bushing outlet recess, its first end extends for a preselected distance past the sprue bushing outlet end while its opposing second end extends upstream into the center of the sprue bushing melt runner passage. The gating needle has an internal heat transfer means in the form of either a highly thermally conductive material disposed in its central interior portion or it may include a hollow sealed tube or "heat pipe" containing a vaporizable liquid held under a partial vacuum. In either instance, the internal heat transfer means serves to provide heat towards the first needle end during the injection of melt into a mold cavity.

Accordingly, it is a general object of the present invention to provide an improved gating system for an injection molding sprue bushing.

Another object of the present invention is to provide an improved gating needle for use with a sprue bushing which is displaceable between a first position and a second position wherein the gating needle includes an elongated needle portion slidingly held within the center of the sprue bushing internal melt runner passage and wherein the needle displaces a preselected distance to its second position generally adjacent the mold cavity gate by the pressure of the injected melt.

A further object of the present invention is to provide an improved gating needle for use within a sprue bushing having a generally circular cavity in its outlet end wherein an elongated needle is supported therein by a plurality of radial fins and wherein the gating needle is capable of restricted reciprocating movement within the melt runner passage of the sprue bushing.

Yet another object of the present invention is to provide a displaceable floating gating needle for use in an injection molding sprue bushing wherein the gating needle is capable of longitudinal movement within the sprue bushing melt runner passage, such that the gating needle maintains a preselected clearance with the mold cavity gate.

Still another object of the present invention is to provide an improved injection molding gating needle for use with a sprue bushing wherein the gating needle has an elongated body portion disposed within the general center of the sprue bushing melt runner passage which body portion extends longitudinally within the melt runner passage from a heated portion thereof to a mold gate and wherein the elongated body portion contains a heat pipe for transferring heat from the rear of the body portion to the front of the body portion.

These and other objects, features and advantages of the present invention will be apparent from the following detailed description taken in conjunction with the accompanying drawings wherein like reference numerals refer to like parts.

BRIEF DESCRIPTION OF THE DRAWINGS

In the course of this description, reference will be made to the attached drawings in which.

DETAILED DESCRIPTION OF THE PREFERRED EMBODIMENTS

Figure 1:
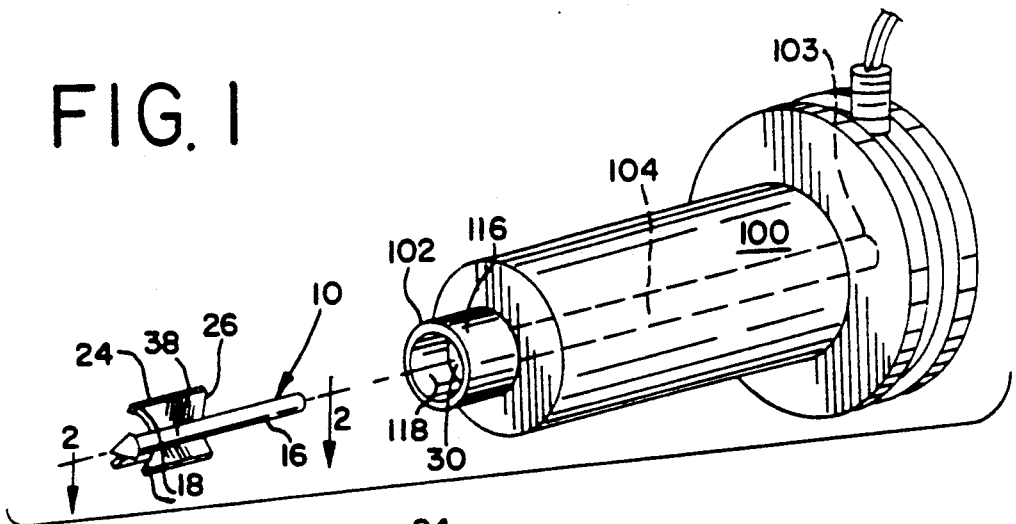
FIG. 1 is an exploded perspective view, of a gating needle constructed in accordance with the principles of the present invention.

A first embodiment of a gating needle assembly 10 constructed in accordance with the principles of the present invention is shown in FIG. 1. The gating needle assembly 10 is disposed within the forward or outlet end 102 of an integral sprue bushing 100 having a melt runner passageway 104 centrally disposed therein and extending longitudinally therethrough between the bushing inlet 103 and outlet 102. The sprue bushing 100 is of the type described and claimed in applicant's U.S. Pat. No. 4,882,469 issued Nov. 21, 1989, the disclosure of which is incorporated hereby by reference.

Figure 3:
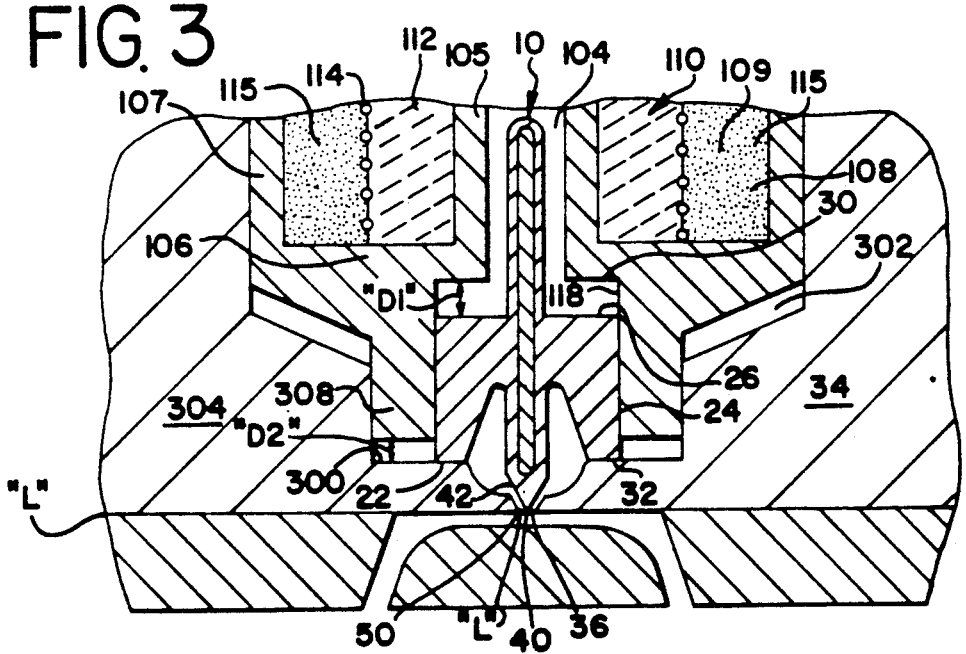
FIG. 3 is a cross-sectional view of a gating needle shown within a sprue bushing in place within a mold block.

As specifically described in U.S. Pat. No. 4,882,469 and as illustrated in FIG. 3, the sprue bushing 100 has an integral construction, that is, the inner core 105 which surrounds the central melt runner passage 104 is integrally formed with the bushing end wall 106 and the bushing outer wall or casing 107 such that no weld joints are present in the path of the melt. In this regard, an annular cavity or compartment 109 is defined by the space between the bushing casing 107 and its inner core 105. This annular compartment 109 is partially occupied by a heating element 110, preferably in the form of a hollow ceramic sleeve 112 which slides over the inner core 105. The ceramic sleeve 112 is circumferentially wound with a preselected length of resistance wire 114 to form a plurality of wire turns extending along the longitudinal axis of the ceramic sleeve 112 within the annular compartment 109. The outer diameter of the heating element sleeve 112 is less than the outer diameter of the annular compartment 109 so that the remainder of the annular compartment 109 forms an exterior annular space 115 between the heating element sleeve 112 and the bushing casing 107. The remainder of the annular compartment is filled with a powdered ceramic refractory material, such as magnesium oxide and is compacted together with the ceramic sleeve 112, such as by swaging, to form a unified mass of particulate material 108 therein. The gating needle assembly 10 is disposed within an annular recess 116 located in the busing outlet end 102 proximate to the end wall 106 of the annular compartment 109.

Figure 2:
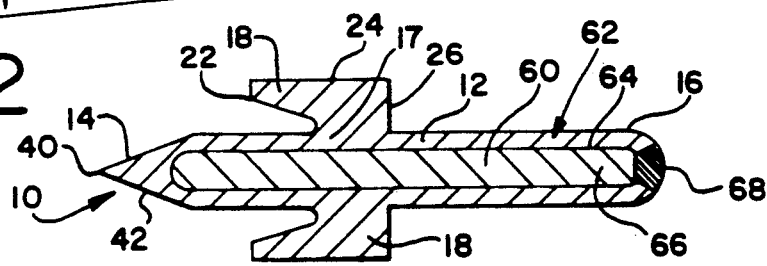
FIG. 2 is a cross-sectional view of the gating needle of FIG. 1 taken along lines 2—2.

As shown in FIG. 2, the needle assembly 10 has a central elongated body portion 12 which extends generally within the center of the melt runner passage 104. The needle elongated body portion 12 includes a first end 14, a second end 16 and an intermediate portion 17 disposed therebetween. The intermediate needle portion 17 serves to position and support the needle 10 within the center of the melt runner passage 104 during operation of the bushing 100 and accordingly, includes a plurality of radial support members 18 which extend radially outwardly from the needle central body portion 12. A minimum of three such support members 18 is preferable to prevent misalignment of the needle and so that the needle body portion 12 is positioned and supported in its preselected location within the melt runner passage 104 during injection of the melt and is not forced into contact with the inner core by the injection pressure of the melt. Consequently, the support members 18 are equally spaced apart around the circumference of the needle central body portion 12 to better balance the needle 10 as described and to provide equal openings 38 surrounding the needle 10 between adjacent support members for injected melt to pass through.

The radial support members 18 are joined to the needle body portion 12 at the intermediate portion 17 which separates the needle first and second ends 14 and 16. Each support member 18 includes at least three distinct support or engagement surfaces 22, 24, 26. One engagement surface 26 is disposed along the rear radial extent of each of the support members 18. This engagement surface 26 is adapted to engage an inner annular rim portion 130 of the sprue bushing outlet recess 116. Another engagement surface 24 extends longitudinally along the outer extent of each of the support members 18 and is adapted to slidingly engage an inner sidewall 118 of the bushing outlet recess 116. In this regard and, as mentioned above, the support members 18 each have a radial extent which positions the needle body portion 12 in the general center of the sprue bushing melt runner passage. Lastly, the remaining, frontal engagement surfaces 22 extends along the forward radial extent of the radial support members 18 and, as well be explained in greater detail below, is adapted to engage an opposing surface 32 of the mold cavity plate 34 surrounding the mold cavity plate 36.

The needle body first end portion 14 extends forwardly of the intermediate portion 17 and its engagement surfaces 22, and positions the end point 40 of the needle tip 42 at the parting line "L" of the mold cavity gate 36 after melt has been injected into the sprue bushing melt runner passage 104 and the needle assembly 10 has been displaced from its first operational position wherein the needle engagement surfaces 26 abuttingly the recess inner rim 130. When the needle assembly 10 is in its second operational position, the needle tip 42 is flush with the mold cavity gate parting line, L, and a preselected annular clearance 38 is defined between the needle tip 42 and the sidewall 50 of the mold cavity gate 36.

The needle body portion 12 and the support members 18 therefor may be integrally formed out of a single piece of metal or may be separately formed and joined by any suitable method, such as by welding. The needle second end 16 extends rearwardly of the radial support members engagement surfaces 26, for a preselected distance upstream within the melt runner passage 104 so that the needle body second end 16 is always held in an area of the melt runner passage heated by the internal heater element 110.

In another important aspect of the present invention, the needle elongated body 12 includes an interior portion 60 which contains a means for transferring heat from the needle second end 16 forwardly to the needle first end 12 and subsequently to the mold cavity gate 36. In the embodiment shown in FIGS. 1-3, the needle body 12 has a two-piece construction, that is, the needle body has an outer casing 62 formed from a suitable metal which is drilled to form a central cavity 64. The central cavity 64 is filled with a highly thermally conductive metal 66, such as copper or any suitable alloy thereof and is sealed with a plug weld 68.

Figure 4:
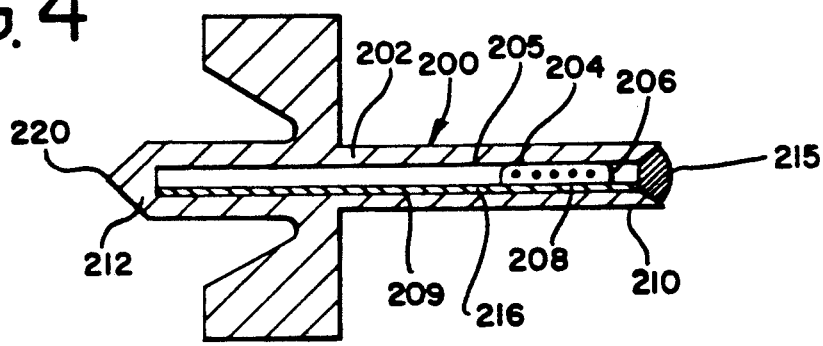
FIG. 4 is a cross-sectional view of a second embodiment of a gating needle constructed in accordance with the principles of the present invention.

Alternatively, as shown in the embodiment of FIG. 4, the needle body 202 may contain a heat pipe 205 in an interior cavity portion 204. As is well known in the art, a heat pipe is a sealed hollow tube into which a vaporizable liquid is placed and the tube subsequently sealed. The vaporizable liquid is vaporized by heat applied to one end of the tube. The liquid vapor travels within the tube to each portion of the tube from which heat is being extracted and the vapor condenses at that portion to yield up its heat of condensation. This results in the heat pipe being maintained at the same temperature for the entire length of the heat pipe hollow tube.

To incorporate this principle in the present invention, a hollow tube 206 extends for substantially the entire length of the needle assembly 200. The hollow tube 206 may be either integrally formed within the needle body 202 as by drilling, or it may be formed as a separate element which is inserted into an interior cavity portion 204 formed by drilling into the needle body 202 which cavity is sealed by an end plug weld 215 so that it is air tight and liquid tight. The hollow tube 206 is partially filled with a preselected quantity of deionized and distilled water 208 under a vacuum. If desired, a wick 216 may also be inserted into the tube 206 to assist the movement of water between the ends 210, 212 of the needle body 202. It is preferable to construct the hollow tube 206 out of a material which will not release hydrogen during the vaporization-condensation cycle such as normal, nickel or other suitable material.

During operation, the temperature of the melt injected through the melt runner passage of the sprue bushing is maintained by the interior heating element 110 of the sprue bushing 100. This hot melt heats the needle second end 210 and vaporizes the water in the heat pipe tube 206. The vapor pressure of the water causes the vapor to circulate to the needle body front end 212, where the temperature of the melt is somewhat lower because it is both past the axial extent of the sprue bushing heating element 110 and because of the needle assembly's proximity to the relatively cool portions of the mold cavity plates. The water vapor thus condenses at the needle front end 212 and gives up its heat of condensation to the needle front end 212, which in turn heats the melt flowing around it. The condensed water is carried back to the rear of the tube 206 by the wick element 216 where it is vaporized again. This cyclic circulation of the entrapped water is very rapid and the heat pipe tube 206 serves to maintain the needle body 202 at a constant temperature. Because the needle tip 220 is positioned at the mold cavity parting line, the temperature of the melt flowing into mold cavity gate is virtually maintained at the same temperature of the upstream melt flowing within the heated area of the sprue bushing melt runner passage. Thus, the needle 200 serves to maintain the temperature of the melt at the mold cavity gate which permits more efficient molding of certain difficult materials.

In another important aspect of the present invention, the needle assembly 10 permits the injection molding system in which it is used to be self-starting. That is, when the injection molding is finished and the bushing 100 cools down to room temperature, the injected melt will solidify in the bushing melt runner passage as well as the area adjacent the mold gate 36 and surrounding the needle assembly 10. When the bushing 100 is reheated, the solidified melt within the heated portion of the melt runner passage liquefies and the melt in the area proximate to the gate 36 is also liquefied by the heat from the rear of the needle which is transferred to its front by the heat transfer mechanism described above.

Importantly, and as mentioned above, the needle assembly 10 of the present invention, is not fixed to the sprue bushing 100 at the recess 116. Rather, the needle assembly 10 is free to move longitudinally under the pressure and force of the melt between a first and a second operational position within the sprue bushing outlet recess. In the first operational position, the rearward needle support member engagement surfaces 26 are seated on the recess inner rim 130, while in the second operational position, the forward needle support member engagement surfaces 22 abuttingly engage the opposing surface 32 of the mold cavity plates 34. The displaceable distance, $D_1$, which the needle 10 travels is selected for the particular injection molding system.

Preferably, the sprue bushing 100 which uses the needle assembly 10 is setoff from the sealing surface 300 opposite the bushing seal collar 308 within the sprue bushing pocket 302 in the mold block outer plate 304 a preselected distance, $D_2$. The needle assembly is a separate member and because it is free to move longitudinally within the bushing recess 116, the needle is isolated from the effect of any thermal expansion of the bushing. In operation, the sprue bushing 100 is positioned the desired distance $D_2$ away from the mold cavity gate opposing surface 32. When melt passes through the melt runner passage 104, the needle assembly 10 moves forwardly until the engagement surfaces 22 abut the mold cavity surface 32. As the bushing 100 grows due to thermal expansion, it will grow into the setoff space between its seal collar 308 and the mold cavity plate 34, while the distance $D_2$ diminishes. In any event, the needle tip 42 is always flush with the mold gate parting line L. Accordingly, the needle assembly 10 of the present invention maintains the needle tip 42 in a constant 'zero' clearance with the mold cavity gate 36. That is, the needle tip 42 is always positioned flush with the mold cavity gate parting line, L, when melt is injected through the bushing to move the needle 10 longitudinally and forwardly within the recess 16. Also, because of the internal heat transfer capabilities of the needle, the first end 14 of the needle 10 is maintained at the mold cavity gate 36 at a constant temperature conducive to the flow of melt.

It will be appreciated that the embodiments of the present invention which have been discussed are merely illustrative of a few of the application of this invention and that numerous modifications may be made by those skilled in the art without departing from the true spirit and scope of this invention.

I claim:

1. An internally heated sprue bushing assembly having an inlet for receiving pressurized melt and an outlet for discharge of the pressurized melt, the sprue bushing assembly comprising a unitary bushing casing-core element having an elongated outer sidewall, an end wall and an elongated inner core integrally formed together, an outer surface of the elongated inner core and an inner surface of said sidewall defining a generally annular compartment within said bushing casing-core element, heating means for heating said elongated inner core, the heating means being disposed in surrounding relation to said elongated inner core, said heating means axially extending a preselected length within and occupying a portion of the annular compartment, a compacted unified mass of particulate material occupying the remainder of said annular compartment, a melt runner passage disposed in said elongated inner core interposed between and in melt flow communication with said inlet and outlet of said sprue bushing assembly, and a gating needle, said sprue bushing outlet including a recess formed therein, the recess being adapted to slidingly receive the gating needle within an inner sidewall thereof, said gating needle including an elongated body having a first end portion, a second end portion and an intermediate portion disposed between said first and second end portions, the intermediate portion including a plurality of radially extending support members, each support member having a first engagement surface being adapted to slidingly engage the outlet recess inner sidewall, a second engagement surface adapted to seatingly engage an interior rim of said outlet recess and a third engagement surface which is adapted to abuttingly engage an opposing surface of a mold cavity plate, the gating needle first end portion projecting forwardly of said intermediate portion and said first engagement surfaces thereof, the gating needle second end portion projecting rearwardly of said intermediate portion and said third engagement surfaces thereof into said melt runner passage for a selected length, said gating needle first end portion having a generally conical tip, the gating needle elongated body including an interior portion having means for transferring heat from said needle second end portion to said needle first end portion, said gating needle being movable along a longitudinal axis within said sprue bushing outlet recess between a first operational position wherein said gating needle intermediate portion first engagement surfaces are in contact with said sprue bushing outlet recess interior rim and a second operational position wherein said gating needle intermediate portion third engagement surfaces are in contact with an opposing surface of a mold cavity plate.

2. The sprue bushing assembly of claim 1, wherein said gating needle interior portion heat transfer means includes a highly thermally conductive metal.

3. The sprue bushing assembly of claim 2, wherein said highly thermally conductive metal is copper.

4. The sprue bushing assembly of claim 1, wherein said gating needle interior portion heat transfer means includes a hollow sealed tube containing a vaporizable liquid under a partial vacuum.

5. The sprue bushing assembly of claim 4, wherein said vaporizable liquid is distilled water and the hollow sealed tube is liquid and gas tight.

6. The sprue bushing assembly of claim 1, wherein said gating needle first end portion has a preselected length such that when said gating needle is displaced to said second operational position, said gating needle intermediate portion third engagement surfaces maintain the conical tip of said needle first end portion flush with an opening of said mold cavity gate whereby an annular opening is defined between said gating needle conical tip and said mold cavity gate.

7. The sprue bushing assembly of claim 1, wherein said gating needle has three radial support members, said radial support members maintaining said gating needle in the center of said melt runner passage.

8. The sprue bushing assembly of claim 1, wherein said gating needle elongated body and said gating needle intermediate portions are integrally formed.

9. A gating needle for an injection molding sprue bushing, said injection molding sprue bushing having a recess of a preselected depth, the recess being disposed in an outlet end thereof, the gating needle being displaceable within the outlet end recess between a first operational position and a second operational position by action of a flow pressurized melt through the sprue bushing upon the exterior surfaces of said gating needle, said gating needle comprising an elongated central needle member, at least three radial support members extending radially outwardly from said needle member, said radial members adapted to slidingly engage said sprue bushing outlet end recess, said radial members each having a first engagement surface disposed on the rearward portions thereof, each first engagement surface engaging an internal rim of said sprue bushing outlet end recess, said radial members also each having a second engagement surface extending longitudinally along said gating needle for a length thereof which is less than said outlet end recess preselected depth, and generally parallel to said elongated needle member, the second engagement surfaces being adapted to engage an inner sidewall of said sprue bushing outlet end recess, and said radial members each further having a third engagement surface disposed along a forward portion thereof, each third engagement surface being adapted to engage an opposing surface of a mold cavity gate, the needle member including a first end having a tip with a generally conical configuration, the needle member tip being generally disposed in line with said radial member third engagement surfaces, and a second end disposed on said needle member opposite the first end, the needle member second portion extending rearwardly of said radial members and upstream into a heated portion of a central melt runner passage of said sprue bushing, the first end tip portion being moved to a location within said sprue bushing outlet recess when said gating needle is displaced to said second operational position wherein an endpoint of said needle first end tip is flush with a parting line of said mold cavity gate, said radial member third engagement surfaces engaging an opposing surface of said mold cavity gate whereby an opening is defined between said needle first end portion in said mold cavity gate, said gating needle being movable back and forth within said outlet end recess between said first and second operational positions for a movement distance which is equal to the sprue bushing outlet end recess depth minus the length of said radial member second engagement surfaces, the movement being effected by flow of melt through said sprue bushing.

10. The gating needle of claim 9, wherein said needle member includes an interior core portion containing means for transferring heat from said injected melt to said mold cavity gate.

11. The gating needle of claim 9, wherein said heat transfer means is formed of a highly heat conductive metal.

12. The gating needle of claim 9, wherein said needle member heat transfer means includes a hollow sealed tube containing a vaporizable liquid under a partial vacuum, the vaporizable liquid filling only a portion of said hollow sealed tube.

13. The gating needle of claim 12, wherein said vaporizable liquid is distilled water, said hollow sealed tube has an air-tight and liquid-tight seal and said hollow sealed tube is partially filled with distilled water.

14. A combination of an injection molding sprue bushing for transferring heat from an internally heated portion of the sprue bushing to a mold cavity gate and a gating needle movable along a longitudinal axis within a recess of an outlet end of the sprue bushing, the sprue bushing comprising an elongated body member having a central melt passageway extending longitudinally therethrough, a heating element disposed within said sprue bushing body member in heat transferring relationship to the body member central melt passageway, said outlet end recess having a given depth, the gating needle comprising an elongated central needle member, at least three radial support members extending radially outwardly from said needle member, each of said radial members slidingly engaging the sprue bushing body member recess, said radial members each having a first engagement surface disposed on the rearward portions thereof, each first engagement surface engaging an internal rim of said outlet end recess, said radial members also each having a second engagement surface extending longitudinally along said gating needle and generally parallel to said elongated needle member, the second engagement surfaces slidingly engaging an inner sidewall of said sprue bushing outlet end recess, and said radial members each further having a third engagement surface disposed along a forward portion thereof, each third engagement surface being adapted to engage an opposing surface of a mold cavity gate, the needle member including a first end having a tip with a generally conical configuration and a second end disposed on said needle member opposite the first end, the needle member second portion extending rearwardly of said radial members and upstream into the internally heated portion of a central melt runner passage of said sprue bushing, said first, second and third radial engagement surfaces positioning said gating needle adjacent said mold cavity gate whereby a generally annular opening is defined between said needle first end portion and said mold cavity gate, said needle member further including an interior core portion having means for transferring heat from the internally heated portion of said sprue bushing to said mold cavity gate in the form of a hollow, sealed tube partially filled with a vaporizable liquid under a partial vacuum, the second engagement surfaces of the radial members having a longitudinal length less than the sprue bushing body member recess depth, thereby permitting longitudinal movement of said gating needle within said outlet end recess between said recess internal rim and said mold cavity gate opposing surface along the longitudinal axis of said sprue bushing central melt passageway, said movement of said gating needle being effected by flow of melt passing through said sprue bushing central melt passageway.

* * * * *